United States Patent
Ono et al.

(10) Patent No.: US 11,412,588 B2
(45) Date of Patent: Aug. 9, 2022

(54) CONTROL APPARATUS OF LIGHT EMITTING DIODE AND NON-TRANSITORY COMPUTER READABLE MEDIUM STORING PROGRAM

(71) Applicant: FUJIFILM Business Innovation Corp., Tokyo (JP)

(72) Inventors: Tomoyuki Ono, Kanagawa (JP); Masaki Nudejima, Kanagawa (JP); Takayuki Hashimoto, Kanagawa (JP); Suguru Oue, Kanagawa (JP); Daiki Takazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 381 days.

(21) Appl. No.: 16/208,580

(22) Filed: Dec. 4, 2018

(65) Prior Publication Data

US 2019/0281677 A1    Sep. 12, 2019

(30) Foreign Application Priority Data

Mar. 9, 2018 (JP) .............................. JP2018-042572

(51) Int. Cl.
*H05B 45/10* (2020.01)
*G06F 9/445* (2018.01)
*H05B 45/325* (2020.01)

(52) U.S. Cl.
CPC ............. *H05B 45/10* (2020.01); *G06F 9/445* (2013.01); *H05B 45/325* (2020.01)

(58) Field of Classification Search
CPC ........ H05B 45/10; H05B 45/37; H05B 45/39; H05B 45/325; H05B 45/327; H05B 45/382

See application file for complete search history.

(56) References Cited

U.S. PATENT DOCUMENTS

| | | | |
|---|---|---|---|
| 8,378,781 B1* | 2/2013 | Peterson | H05B 47/155 340/3.5 |
| 8,639,207 B2 | 1/2014 | Tsunoda | |
| 2009/0079358 A1* | 3/2009 | Shteynberg | H05B 45/3725 315/291 |
| 2010/0284690 A1* | 11/2010 | Rajagopal | H04B 10/116 398/43 |

(Continued)

FOREIGN PATENT DOCUMENTS

| | | |
|---|---|---|
| JP | 2010123277 | 6/2010 |
| JP | 2011248780 | 12/2011 |

(Continued)

OTHER PUBLICATIONS

"Office Action of Japan Counterpart Application" with English translation thereof, dated Feb. 8, 2022, p. 1-p. 5.

*Primary Examiner* — Tung X Le
(74) *Attorney, Agent, or Firm* — JCIPRNET

(57) ABSTRACT

A control apparatus of a light emitting diode includes a storage unit that stores table information indicating a combination of a magnitude and a cycle of luminance and the number of times of the combinations; and a control section that controls the light emitting diode in accordance with a control pattern in which the combination of the magnitude and the cycle of the luminance indicated in the table information is repeated up to the number of times of the combinations.

13 Claims, 10 Drawing Sheets

(56) References Cited

U.S. PATENT DOCUMENTS

| | | | |
|---|---|---|---|
| 2011/0292448 A1 | 12/2011 | Ohashi | |
| 2013/0181630 A1* | 7/2013 | Taipale | H05B 45/10 |
| | | | 315/224 |
| 2016/0323953 A1* | 11/2016 | DeJonge | H05B 45/37 |
| 2016/0381770 A1* | 12/2016 | Murakami | H04W 4/70 |
| | | | 315/291 |
| 2017/0228874 A1* | 8/2017 | Roberts | G01S 15/08 |
| 2017/0311414 A1* | 10/2017 | Kido | H05B 47/105 |
| 2018/0146520 A1* | 5/2018 | Williams | H05B 45/00 |

FOREIGN PATENT DOCUMENTS

| | | |
|---|---|---|
| JP | 2012004638 | 1/2012 |
| JP | 2016131068 | 7/2016 |
| KR | 20110025277 | 3/2011 |

* cited by examiner

⟨ TABLE DATA ⟩

| (NUMBER OF TIMES OF LOOPS 5) | LUMINANCE VALUE | LUMINANCE CYCLE | NUMBER OF TIMES | PRESENCE OR ABSENCE OF NEXT PARAMETER | NEXT PARAMETER ADDRESS |
|---|---|---|---|---|---|
| PARAMETER 1 | LUMINANCE 1 | 50.0[ms] | 1 TIME | PRESENCE | ADDRESS 2 |
| PARAMETER 2 | LUMINANCE 2 | 50.0[ms] | 2 TIMES | PRESENCE | ADDRESS 3 |
| PARAMETER 3 | LUMINANCE 3 | 50.0[ms] | 3 TIMES | PRESENCE | ADDRESS 4 |
| ⋮ | ⋮ | ⋮ | ⋮ | ⋮ | ⋮ |
| PARAMETER N | LUMINANCE N | 50.0[ms] | N TIMES | ABSENCE | (NONE) |

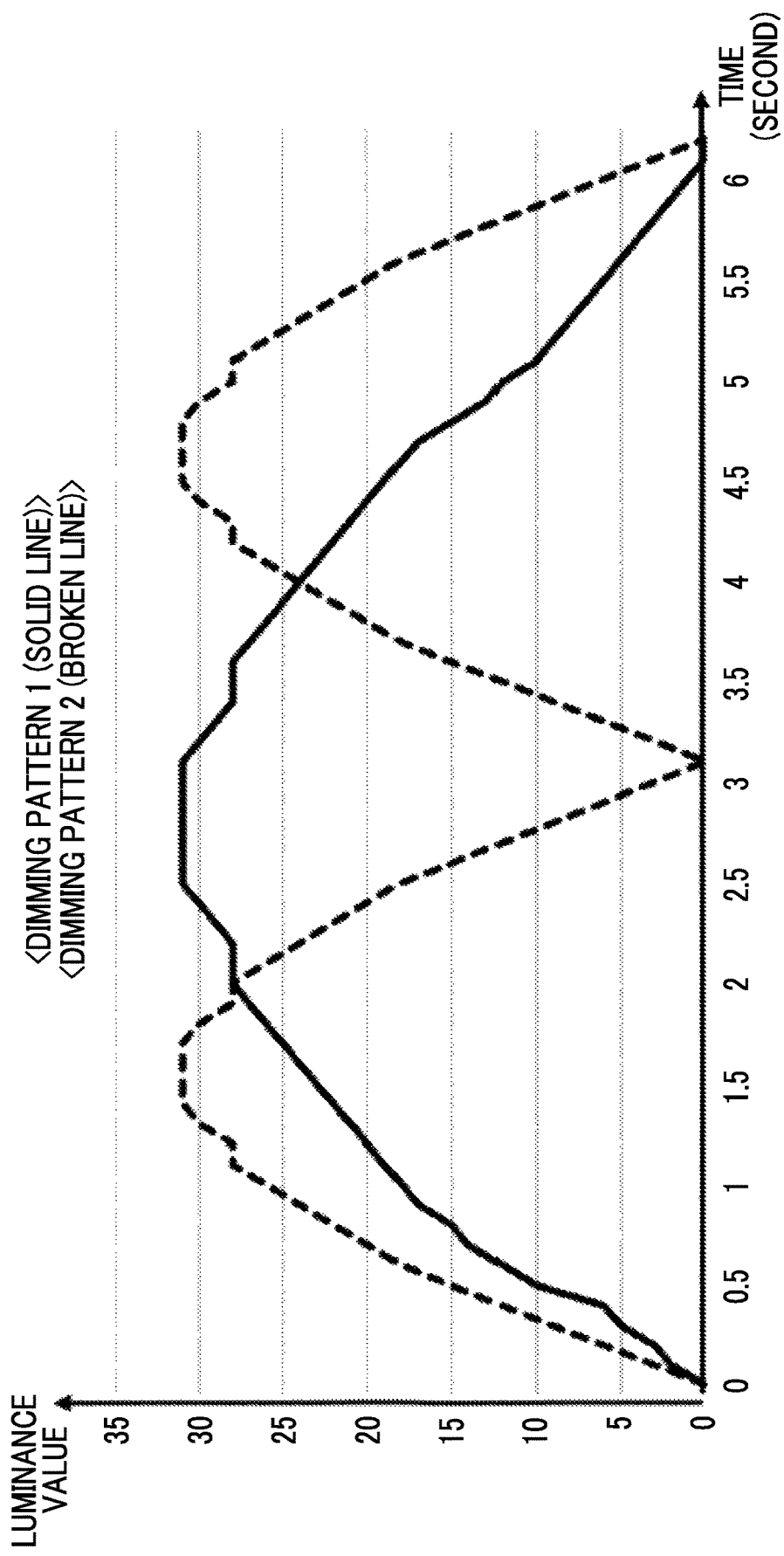

FIG. 5

⟨ TABLE DATA OF DIMMING PATTERN 1 ⟩

| (NUMBER OF TIMES OF LOOPS 1) | LUMINANCE VALUE | LUMINANCE CYCLE | NUMBER OF TIMES | PRESENCE OR ABSENCE OF NEXT PARAMETER | NEXT PARAMETER ADDRESS |
|---|---|---|---|---|---|
| PARAMETER (TIME OF 0 SECONDS) | LUMINANCE 0 | 0.1[s] | 1 TIME | PRESENCE | ADDRESS 1 |
| PARAMETER (TIME OF 0.1 SECONDS) | LUMINANCE 2 | 0.1[s] | 1 TIME | PRESENCE | ADDRESS 2 |
| PARAMETER (TIME OF 0.2 SECONDS) | LUMINANCE 3 | 0.1[s] | 1 TIME | PRESENCE | ADDRESS 3 |
| ⋮ | ⋮ | ⋮ | ⋮ | ⋮ | ⋮ |
| PARAMETER (TIME OF 2.4 SECONDS) | LUMINANCE 30 | 0.1[s] | 1 TIME | PRESENCE | ADDRESS 25 |
| PARAMETER (TIME OF 2.5 SECONDS TO 3.1 SECONDS) | LUMINANCE 31 | 0.1[s] | 7 TIMES | PRESENCE | ADDRESS 26 |
| PARAMETER (TIME OF 3.2 SECONDS) | LUMINANCE 30 | 0.1[s] | 1 TIME | PRESENCE | ADDRESS 27 |
| ⋮ | ⋮ | ⋮ | ⋮ | ⋮ | ⋮ |
| PARAMETER (TIME OF 6.1 SECONDS) | LUMINANCE 0 | 0.1[s] | 1 TIME | ABSENCE | (NONE) |

FIG. 6

⟨ TABLE DATA OF DIMMING PATTERN 2 ⟩

| (NUMBER OF TIMES OF LOOPS 2) | LUMINANCE VALUE | LUMINANCE CYCLE | NUMBER OF TIMES | PRESENCE OR ABSENCE OF NEXT PARAMETER | NEXT PARAMETER ADDRESS |
|---|---|---|---|---|---|
| PARAMETER (TIME OF 0 SECONDS) | LUMINANCE 0 | 0.1[s] | 1 TIME | PRESENCE | ADDRESS 1 |
| PARAMETER (TIME OF 0.1 SECONDS) | LUMINANCE 3 | 0.1[s] | 1 TIME | PRESENCE | ADDRESS 2 |
| PARAMETER (TIME OF 0.2 SECONDS) | LUMINANCE 6 | 0.1[s] | 1 TIME | PRESENCE | ADDRESS 3 |
| ⋮ | ⋮ | ⋮ | ⋮ | ⋮ | ⋮ |
| PARAMETER (TIME OF 1.3 SECONDS) | LUMINANCE 30 | 0.1[s] | 1 TIME | PRESENCE | ADDRESS 14 |
| PARAMETER (TIME OF 1.4 SECONDS TO 1.7 SECONDS) | LUMINANCE 31 | 0.1[s] | 4 TIMES | PRESENCE | ADDRESS 15 |
| PARAMETER (TIME OF 1.8 SECONDS) | LUMINANCE 30 | 0.1[s] | 1 TIME | PRESENCE | ADDRESS 16 |
| ⋮ | ⋮ | ⋮ | ⋮ | ⋮ | ⋮ |
| PARAMETER (TIME OF 3.0 SECONDS) | LUMINANCE 3 | 0.1[s] | 1 TIME | ABSENCE | (NONE) |

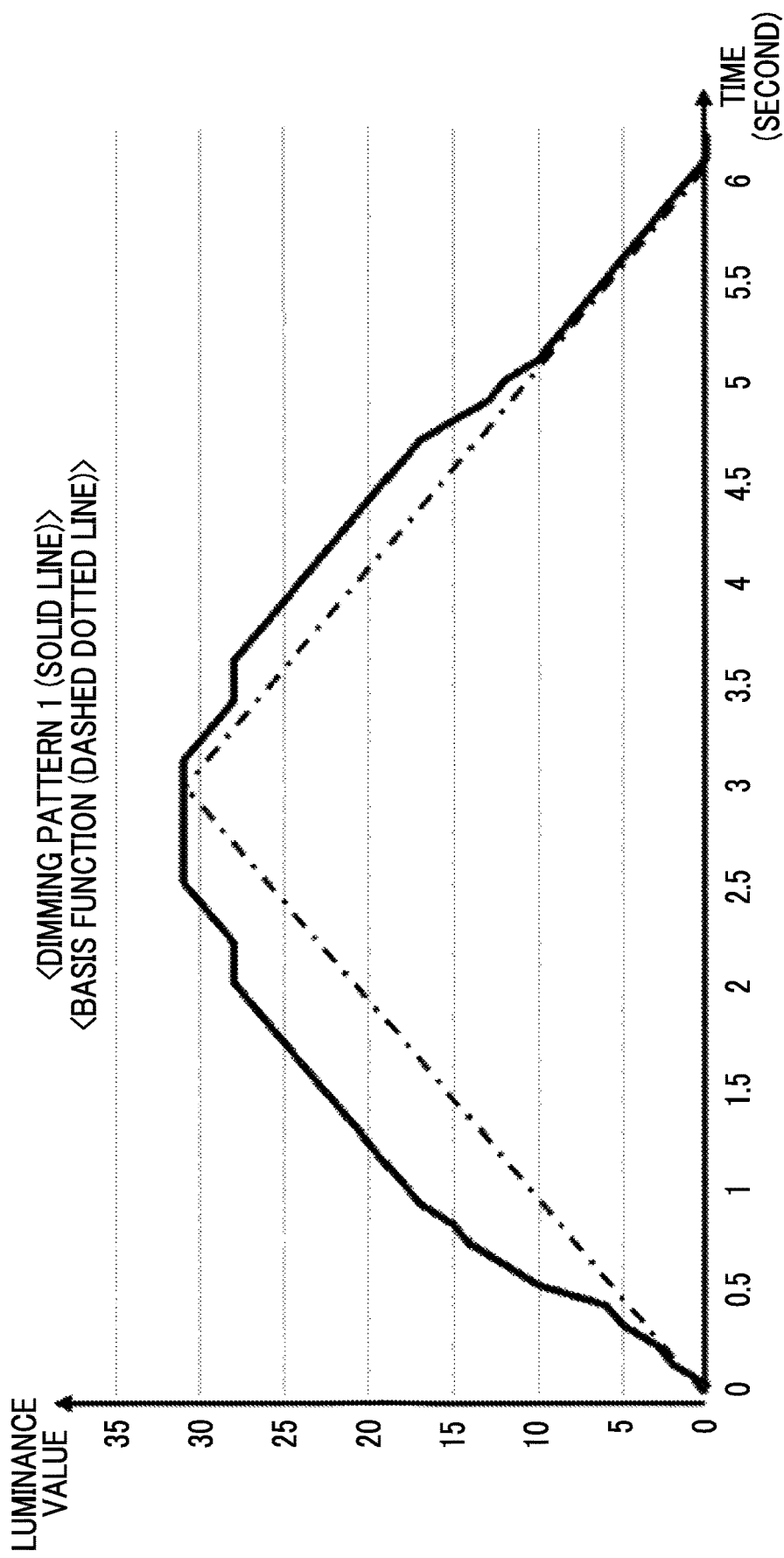

FIG.8

< TABLE DATA (DIFFERENCE LUMINANCE VALUE) OF DIMMING PATTERN 1 >

| (NUMBER OF TIMES OF LOOPS 1) | DIFFERENCE LUMINANCE VALUE | LUMINANCE CYCLE | NUMBER OF TIMES | PRESENCE OR ABSENCE OF NEXT PARAMETER | NEXT PARAMETER ADDRESS |
|---|---|---|---|---|---|
| PARAMETER (TIME OF 0 SECONDS) | DIFFERENCE 0 | 0.1[s] | 1 TIME | PRESENCE | ADDRESS 1 |
| PARAMETER (TIME OF 0.1 SECONDS) | DIFFERENCE 1 | 0.1[s] | 1 TIME | PRESENCE | ADDRESS 2 |
| PARAMETER (TIME OF 0.2 SECONDS) | DIFFERENCE 1 | 0.1[s] | 1 TIME | PRESENCE | ADDRESS 3 |
| ⋮ | ⋮ | ⋮ | ⋮ | ⋮ | ⋮ |
| PARAMETER (TIME OF 2.9 SECONDS) | DIFFERENCE 2 | 0.1[s] | 1 TIME | PRESENCE | ADDRESS 30 |
| PARAMETER (TIME OF 3.0 SECONDS) | DIFFERENCE 1 | 0.1[s] | 1 TIME | PRESENCE | ADDRESS 31 |
| PARAMETER (TIME OF 3.1 SECONDS) | DIFFERENCE 0 | 0.1[s] | 1 TIME | PRESENCE | ADDRESS 32 |
| ⋮ | ⋮ | ⋮ | ⋮ | ⋮ | ⋮ |
| PARAMETER (TIME OF 6.1 SECONDS) | DIFFERENCE 0 | 0.1[s] | 1 TIME | ABSENCE | (NONE) |

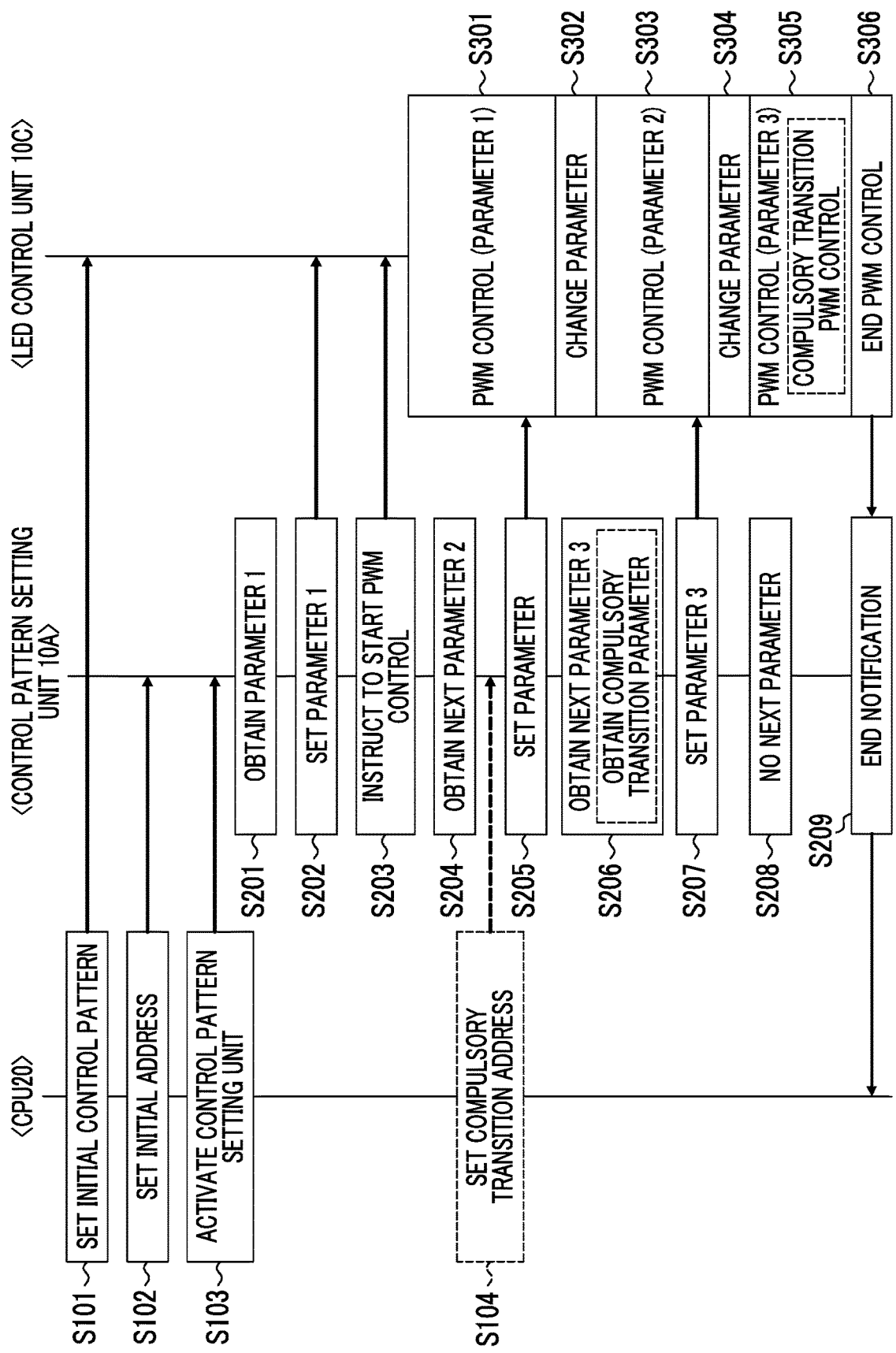

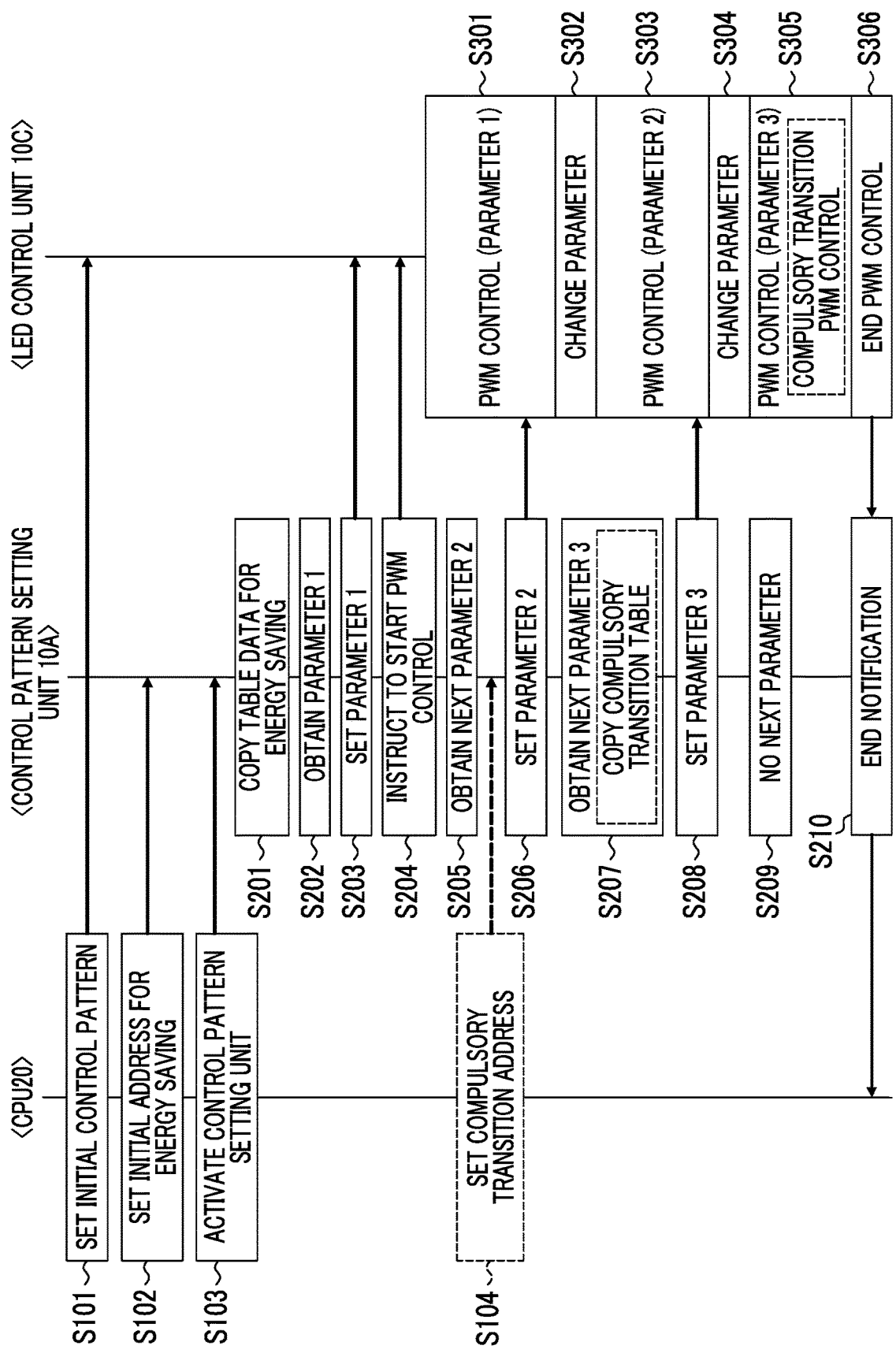

CONTROL APPARATUS OF LIGHT EMITTING DIODE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-042572 filed Mar. 9, 2018.

BACKGROUND

(i) Technical Field

The present invention relates to a control apparatus of a light emitting diode and a non-transitory computer readable medium storing a program.

(ii) Related Art

JP2011-248780A discloses a program execution control method in which a first program which operates at the time of printing and a second program which operates at the time of sleep are stored in a ROM, and a CPU executes the first program by developing the first program to a RAM and using a work area of the RAM at the time of the printing and executes the second program by not developing the second program to the RAM and not using the work area of the RAM at the time of the sleep.

JP2012-004638A discloses an electronic device which turns off an LED intermittently in a case where a wireless communication device is at an energy saving mode and turns off the LED in a case where the wireless communication device returns from the energy saving mode.

JP2016-131068A discloses a dimming lighting device which sequentially reads index data of time series from an index data table for each of PWM cycles, reads brightness data from a brightness data table according to designation of the read index data, and generates a dimming signal of a PWM method for dimming an LED based on the read brightness data.

SUMMARY

Aspects of non-limiting embodiments of the present disclosure relate to a technology of improving expandability of control of a light emitting diode according to table information as compared with a case where there is no number of times of combinations in the table information.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control apparatus of a light emitting diode including a storage unit that stores table information indicating a combination of a magnitude and a cycle of luminance and the number of times of the combinations; and a control section that controls the light emitting diode in accordance with a control pattern in which the combination of the magnitude and the cycle of the luminance indicated in the table information is repeated up to the number of times of the combinations.

BRIEF DESCRIPTION OF THE DRAWINGS

Exemplary embodiment(s) of the present invention will be described in detail based on the following figures, wherein:

FIG. 4 is a diagram illustrating a specific example of a dimming pattern of the LED;

FIG. 5 is a diagram illustrating a specific example of table data for realizing a dimming pattern 1;

FIG. 6 is a diagram illustrating a specific example of table data for realizing a dimming pattern 2;

FIG. 7 is a diagram illustrating a specific example of a function corresponding to a luminance change;

FIG. 8 is a diagram illustrating a specific example of table data indicating a magnitude of luminance according to a difference between a function value and a luminance value;

FIG. 10 is a diagram illustrating a specific example of LED control in a normal operation mode; and FIG. 11 is a diagram illustrating a specific example of LED control in an energy saving operation mode.

DETAILED DESCRIPTION

Figure 1:
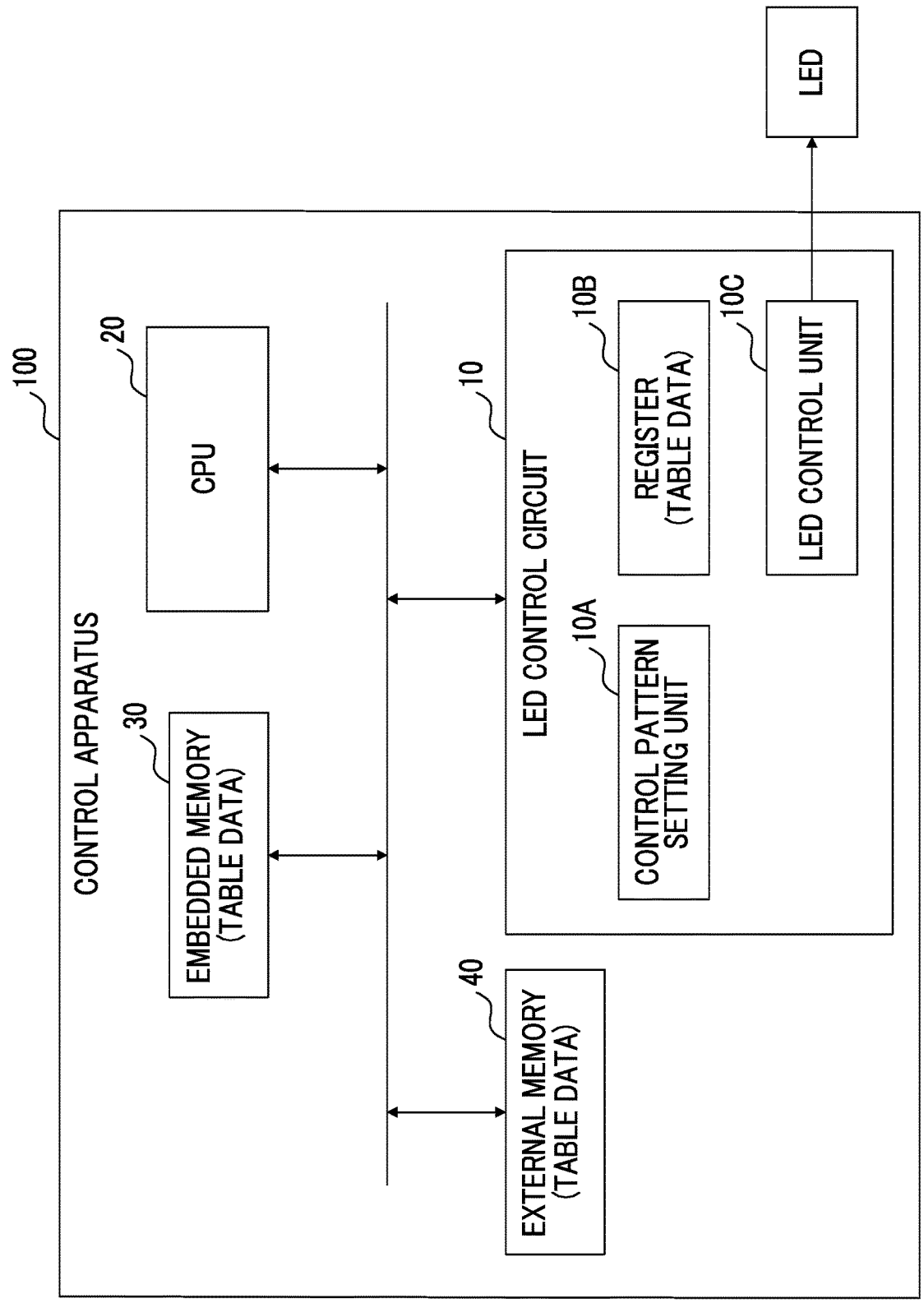
FIG. 1 is a diagram illustrating a control apparatus of an LED as an example of a specific embodiment of an exemplary embodiment of the invention.

FIG. 1 is a diagram illustrating a control apparatus 100 of a light emitting diode (LED) as an example of a specific embodiment of an exemplary embodiment of the invention. The light emitting diode (LED) is provided, for example, in various devices as illumination.

In the specific example illustrated in FIG. 1, the control apparatus 100 includes an LED control circuit 10, a central processing unit (CPU) 20, an embedded memory 30, and an external memory 40. For example, the LED control circuit 10, the CPU 20, and the embedded memory 30 are integrated as a system-on-a-chip (SOC) and the external memory 40 is provided as an external device of the SOC.

The LED control circuit 10 controls (dimming) light emission of the light emitting diode (LED). The LED control circuit 10 includes a control pattern setting unit 10A, a register 10B, and an LED control unit 10C. The LED control circuit 10 controls the LED with the light emission according to table data stored in the register 10B.

The CPU 20 generally controls a plurality of function blocks denoted by reference numerals in the control apparatus 100 illustrated in FIG. 1. For example, the embedded memory 30 is a storage device such as a static random-access memory (SRAM). For example, the external memory 40 is a storage device such as a dynamic random-access memory (DRAM) or a read-only memory (ROM). The embedded memory 30 and the external memory 40 also store the table data used for controlling the LED.

The control apparatus 100 illustrated in FIG. 1 may be realized, for example, by using a computer. The computer includes hardware resources of an arithmetic device such as a CPU, a storage device such as a memory or a hard disk, a communication device using a communication line such as the internet, a device for reading data from a storage medium such as an optical disc or a semiconductor memory and writing the data, a display device such as a display, an operation device for receiving an operation from a user, and the like.

For example, a program (software) corresponding to functions of at least some units among a plurality of units denoted by reference numerals and included in the control apparatus 100 illustrated in FIG. 1 is read into the computer and at least some functions included the control apparatus 100 may be realized by the computer with a collaboration between the hardware resources of the computer and the read software. The program may be provided to a computer (control apparatus 100) via a communication line such as the internet, or may be stored in a storage medium such as an optical disc or a semiconductor memory and provided to a computer (control apparatus 100).

In the specific example illustrated in FIG. 1, the LED control circuit 10 controls the light emission of the LED according to pulse width modulation (PWM) control. Therefore, a specific example of the PWM control will be described.

Figures 2, 3:
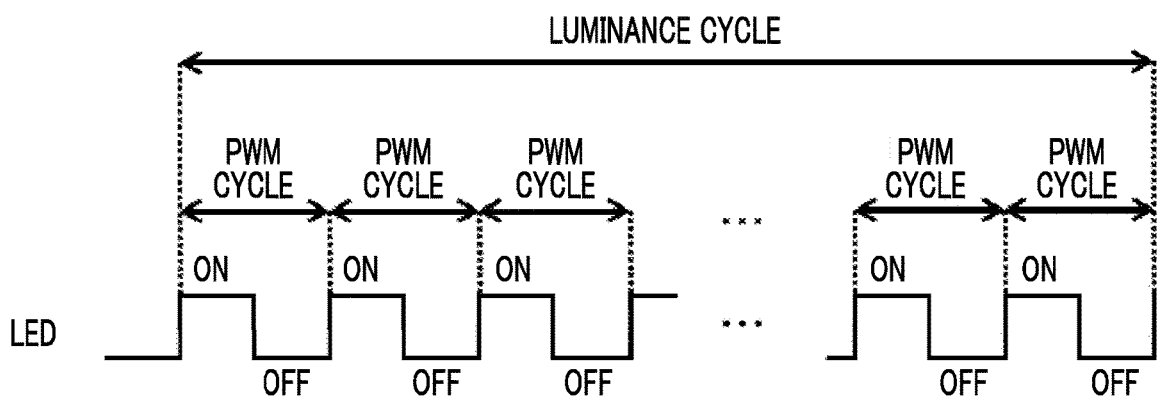
FIG. 2 is a diagram for explaining a specific example of PWM control.
FIG. 3 is a diagram illustrating a specific example of table data.

FIG. 2 is a diagram for explaining the specific example of the PWM control. In the PWM control, illuminance (brightness) of the LED is controlled by a length of a period of a light-emitting state while the light-emitting state and a light-off state of the light emitting diode (LED) are repeated.

A PWM cycle is one set period of the light-emitting state (ON) and the light-off state (OFF) of the LED. For example, the PWM cycle is fixed (constant value). Furthermore, the PWM cycle may be adjusted according to, for example, use of the LED.

The length of the period of the light-emitting state (ON) within one PWM cycle is determined according to a target luminance value. For example, the period of the light-emitting state (ON) is set to be longer as the luminance value is larger. In a case where the period of the light-emitting state (ON) is equal to the PWM cycle, a period of the light-off state (OFF) becomes zero and the illuminance of the LED becomes the maximum.

A luminance cycle is a period during which a constant luminance value is maintained. Therefore, the length of the period of the light-emitting state (ON) is constant within all of the PWM cycles included in one luminance cycle.

The LED control circuit 10 in FIG. 1 executes the PWM control of the specific example illustrated in FIG. 2, for example, according to the table data stored in the register 10B or the like.

FIG. 3 is a diagram illustrating a specific example of the table data. The table data is configured to include one or more parameters. FIG. 3 illustrates the specific example of the table data configured to include N (N is natural number) parameters from a parameter 1 to a parameter N.

In the specific example illustrated in FIG. 3, each of the parameters is configured to include a luminance value, a luminance cycle, the number of times, presence or absence of a next parameter, and a next parameter address.

The luminance value is a value indicating a magnitude of luminance. According to the magnitude of the luminance value, the length of the period of the light-emitting state (see FIG. 2) is determined within one PWM cycle. In the specific example illustrated in FIG. 3, a luminance value of the parameter 1 is set to luminance 1, a luminance value of the parameter 2 is set to luminance 2, and a luminance value of the parameter 3 is set to luminance 3.

The luminance cycle is a period during which the magnitude of the luminance indicated by the luminance value is maintained (see FIG. 2). In the specific example illustrated in FIG. 3, the luminance cycle is set to 50.0 ms (milliseconds) in all of the parameters from the parameter 1 to the parameter N. Furthermore, luminance cycles different from one another may be set to a plurality of parameters.

The number of times is the number of times a combination of the luminance value and the luminance cycle is repeated. In the specific example illustrated in FIG. 3, the number of times is set to 1 in the parameter 1. Therefore, in control corresponding to the parameter 1, the luminance cycle of 50.0 ms with the luminance value of luminance 1 is executed 1 time. In addition, the number of times is set to 2 in the parameter 2. Therefore, in control corresponding to the parameter 2, the luminance cycle of 50.0 ms with the luminance value of luminance 2 is executed 2 times.

The presence or absence of the next parameter indicates the presence or absence of the following parameter. In the specific example illustrated in FIG. 3, since the parameter 2 is followed by the parameter 1, the presence or absence of the next parameter included in the parameter 1 is set to present. In addition, since no parameter is followed by the last parameter N, the presence or absence of the next parameter included in the last parameter N is set to absent.

The next parameter address indicates an address at which the next parameter is stored. In the specific example illustrated in FIG. 3, since the parameter 2 is followed by the parameter 1, address 2 corresponding to the parameter 2 is set to the next parameter address included in the parameter 1. Since no parameter is followed by the last parameter N, no address is set to the next parameter address included in the last parameter N.

In addition, the number of times of loops may be set to the table data. The number of times of loops is the number of times control according to the table data is repeated (table is repeated). In the specific example illustrated in FIG. 3, the number of times of loops is set to 5 in the table data. For this reason, the control according to the table data in FIG. 3 is repeated 5 times. That is, the control of the parameters 1 to N included in the table data in FIG. 3 is repeated 5 times.

For example, by using the table data of the specific example illustrated in FIG. 3, various dimming patterns of the LED may be realized.

FIG. 4 is a diagram illustrating a specific example of a dimming pattern of the LED. FIG. 4 illustrates a luminance profile of the dimming pattern 1 (solid line) and the dimming pattern 2 (broken line) as a specific example of the dimming pattern. In FIG. 4, a horizontal axis indicates time (second) and a vertical axis indicates a luminance value. Specific examples of the table data for realizing the dimming pattern 1 and the dimming pattern 2 in FIG. 4 are illustrated in FIGS. 5 and 6.

FIG. 5 is a diagram illustrating the specific example of the table data for realizing the dimming pattern 1 (see FIG. 4). FIG. 5 illustrates the table data configured to include the plurality of parameters corresponding to a plurality of times (horizontal axis in FIG. 4).

In the specific example illustrated in FIG. 5, luminance 0 (zero), the luminance cycle of 0.1 s, and 1 time are set to the parameter corresponding to time of 0 seconds, luminance 2, the luminance cycle of 0.1 s, and 1 time are set to the parameter corresponding to time of 0.1 seconds, and luminance 3, the luminance cycle of 0.1 s, and 1 time are set to the parameter corresponding to time of 0.2 seconds. By the control corresponding to the parameters, the luminance cycle of 0.1 s having a luminance value of luminance 0 is executed 1 time for a period corresponding to a time of 0 seconds, the luminance cycle of 0.1 s having a luminance value of luminance 2 is executed 1 time for a period corresponding to a time of 0.1 seconds, and the luminance cycle of 0.1 s having a luminance value of luminance 3 is executed 1 time for a period corresponding to a time of 0.2 seconds.

The control is executed according to the parameters (not illustrated) for periods corresponding to times of 0.3 seconds to 2.3 seconds.

In addition, in the specific example illustrated in FIG. 5, luminance 30, the luminance cycle of 0.1 s, and 1 time are set to the parameter corresponding to a time of 2.4 seconds. By the control corresponding to the parameter, the luminance cycle of 0.1 s having a luminance value of luminance 30 is executed 1 time for a period corresponding to a time of 2.4 seconds.

In the specific example illustrated in FIG. 5, luminance 31, the luminance cycle of 0.1 s, and 7 times are set to the parameter (one parameter) corresponding to a time of 2.5 seconds to 3.1 seconds. Since the number of times is set to 7 in the parameter, the luminance cycle of 0.1 s having a luminance value of luminance 31 is executed 7 times for a period corresponding to the time of 2.5 seconds to 3.1 seconds.

In addition, in the specific example illustrated in FIG. 5, luminance 30, the luminance cycle of 0.1 s, and 1 time are set to the parameter corresponding to a time of 3.2 seconds. By the control corresponding to the parameter, the luminance cycle of 0.1 s having a luminance value of luminance 30 is executed 1 time for a period corresponding to a time of 3.2 seconds. The control is executed according to the parameters (not illustrated) for periods corresponding to times of 3.3 seconds to 6.0 seconds.

In the specific example illustrated in FIG. 5, luminance 0 (zero), the luminance cycle of 0.1 s, and 1 time are set to the parameter corresponding to a time of 6.1 seconds. By the control corresponding to the parameter, the luminance cycle of 0.1 s having a luminance value of luminance 0 is executed 1 time for a period corresponding to a time of 6.1 seconds.

Thus, by controlling the LED from the time of 0 seconds to the time of 6.1 seconds according to the table data illustrated in FIG. 5, the luminance profile of the dimming pattern 1 illustrated in FIG. 4 is realized. In a case where it is desired to repeatedly execute the dimming pattern 1 in FIG. 4 M times (M is natural number), the number of times of loops 1 of the table data illustrated in FIG. 5 may be changed to the number of times of loops M.

In the table data illustrated in FIG. 5, since the number of times is set to 7 in the parameter corresponding to the time of 2.5 seconds to 3.1 seconds, only one parameter is used for the period of the time of 2.5 seconds to 3.1 seconds.

FIG. 6 is a diagram illustrating the specific example of the table data for realizing the dimming pattern 2 (see FIG. 4). FIG. 6 illustrates the table data configured to include the plurality of parameters corresponding to the plurality of times (horizontal axis in FIG. 4).

In the specific example illustrated in FIG. 6, luminance 0 (zero), the luminance cycle of 0.1 s, and 1 time are set to the parameter corresponding to time of 0 seconds, luminance 3, the luminance cycle of 0.1 s, and 1 time are set to the parameter corresponding to time of 0.1 seconds, and luminance 6, the luminance cycle of 0.1 s, and 1 time are set to the parameter corresponding to time of 0.2 seconds. By the control corresponding to the parameters, the luminance cycle of 0.1 s having a luminance value of luminance 0 is executed 1 time for a period corresponding to a time of 0 seconds, the luminance cycle of 0.1 s having a luminance value of luminance 3 is executed 1 time for a period corresponding to a time of 0.1 seconds, and the luminance cycle of 0.1 s having a luminance value of luminance 6 is executed 1 time for a period corresponding to a time of 0.2 seconds.

The control is executed according to the parameters (not illustrated) for periods corresponding to times of 0.3 seconds to 1.2 seconds.

In addition, in the specific example illustrated in FIG. 6, luminance 30, the luminance cycle of 0.1 s, and 1 time are set to the parameter corresponding to a time of 1.3 seconds. By the control corresponding to the parameter, the luminance cycle of 0.1 s having a luminance value of luminance 30 is executed 1 time for a period corresponding to the time of 1.3 seconds.

In the specific example illustrated in FIG. 6, luminance 31, the luminance cycle of 0.1 s, and 4 times are set to the parameter (one parameter) corresponding to a time of 1.4 seconds to 1.7 seconds. Since the number of times is set to 4 in the parameter, the luminance cycle of 0.1 s having a luminance value of luminance 31 is executed 4 times for a period corresponding to the time of 1.4 seconds to 1.7 seconds.

In addition, in the specific example illustrated in FIG. 6, luminance 30, the luminance cycle of 0.1 s, and 1 time are set to the parameter corresponding to a time of 1.8 seconds. By the control corresponding to the parameter, the luminance cycle of 0.1 s having a luminance value of luminance 30 is executed 1 time for a period corresponding to the time of 1.8 seconds. The control is executed according to the parameters (not illustrated) for periods corresponding to times of 1.9 seconds to 2.9 seconds.

In the specific example illustrated in FIG. 6, luminance 3, the luminance cycle of 0.1 s, and 1 time are set to the parameter corresponding to a time of 3.0 seconds. By the control corresponding to the parameter, the luminance cycle of 0.1 s having a luminance value of luminance 3 is executed 1 time for a period corresponding to the time of 3.0 seconds.

Thus, by controlling the LED from the time of 0 seconds to the time of 3.0 seconds according to the table data illustrated in FIG. 6, the luminance profile for the period from the time of 0 seconds to the time of 3.0 seconds of the dimming pattern 2 illustrated in FIG. 4 is realized.

In addition, since the number of times of loops is set to 2 in the table data illustrated in FIG. 6, the control according to the table data illustrated in FIG. 6 is executed again at the time of 3.1 seconds. Accordingly, the luminance profile for the period from the time of 3.1 seconds to the time of 6.1 seconds of the dimming pattern 2 illustrated in FIG. 4 is realized. In a case where it is desired to further repeatedly execute the dimming pattern 2 in FIG. 4, the number of times of loops of the table data illustrated in FIG. 6 may be changed to 2 or more.

In FIGS. 3, 5, and 6, the specific example of the table data illustrating the magnitude of the luminance according to the luminance value is described, but the magnitude of the luminance may be indicated according to a difference between the function value and the luminance value corresponding to a luminance change.

FIG. 7 is a diagram illustrating a specific example of a function corresponding to the luminance change. FIG. 7 illustrates the specific example of the dimming pattern 1 (see FIG. 4) and a basis function corresponding to the luminance change of the dimming pattern 1. In the specific example illustrated in FIG. 7, the basis function is configured to include a function 1 of "function value=time (second)×10"

corresponding to a period from a time of 0 seconds to a time of 3.1 seconds and a function 2 of "function value={6.1−time (second)}×10" corresponding to a period from a time of 3.2 seconds to a time of 6.1 seconds.

FIG. 8 is a diagram illustrating a specific example of the table data indicating the magnitude of the luminance according to a difference between the function value and the luminance value. FIG. 8 illustrates the specific example of the table data for realizing the dimming pattern 1 (FIGS. 4 and 7).

The table data illustrated in FIG. 8 indicates a magnitude of luminance according to a difference (difference luminance value) between the luminance value of the dimming pattern 1 and the function value of the basis function illustrated in FIG. 7. For example, the difference luminance value included in the parameter corresponding to a time of 0 seconds is a difference of 0 (zero) between a luminance value of 0 (zero) of the dimming pattern 1 at the time of 0 seconds and a function value of 0 (zero) of the basis function at the time of 0 seconds. In addition, the difference luminance value included in the parameter corresponding to a time of 2.9 seconds is a difference of 2 between the luminance value of 31 of the dimming pattern 1 at the time of 2.9 seconds and the function value of 29 of the basis function at the time of 2.9 seconds.

In a case of being compared with the luminance value included in the table data of the dimming pattern 1 illustrated in FIG. 5, the difference luminance value included in the table data of the dimming pattern 1 illustrated in FIG. 8 is a generally small value. For this reason, the amount of data (for example, number of bits) to be assigned to the difference luminance value may be smaller than the amount of data (for example, number of bits) to be assigned to the luminance value.

FIGS. 7 and 8 illustrate the specific examples of the basis function combining the function 1 and the function 2 which are linear functions, the amount of data (for example, number of bits) to be assigned to the difference luminance value may be smaller than in the case of the linear function by using, for example, a secondary or higher function or a sine wave function as a basis function.

Returning to FIG. 1, the table data is stored in the three storage devices of the register 10B, the embedded memory 30, and the external memory 40 included in the LED control circuit 10. The control apparatus 100 changes the storage device usable by the LED control circuit 10 according to an operation mode in a plurality of operation modes having different power consumption from one another.

Figure 9:
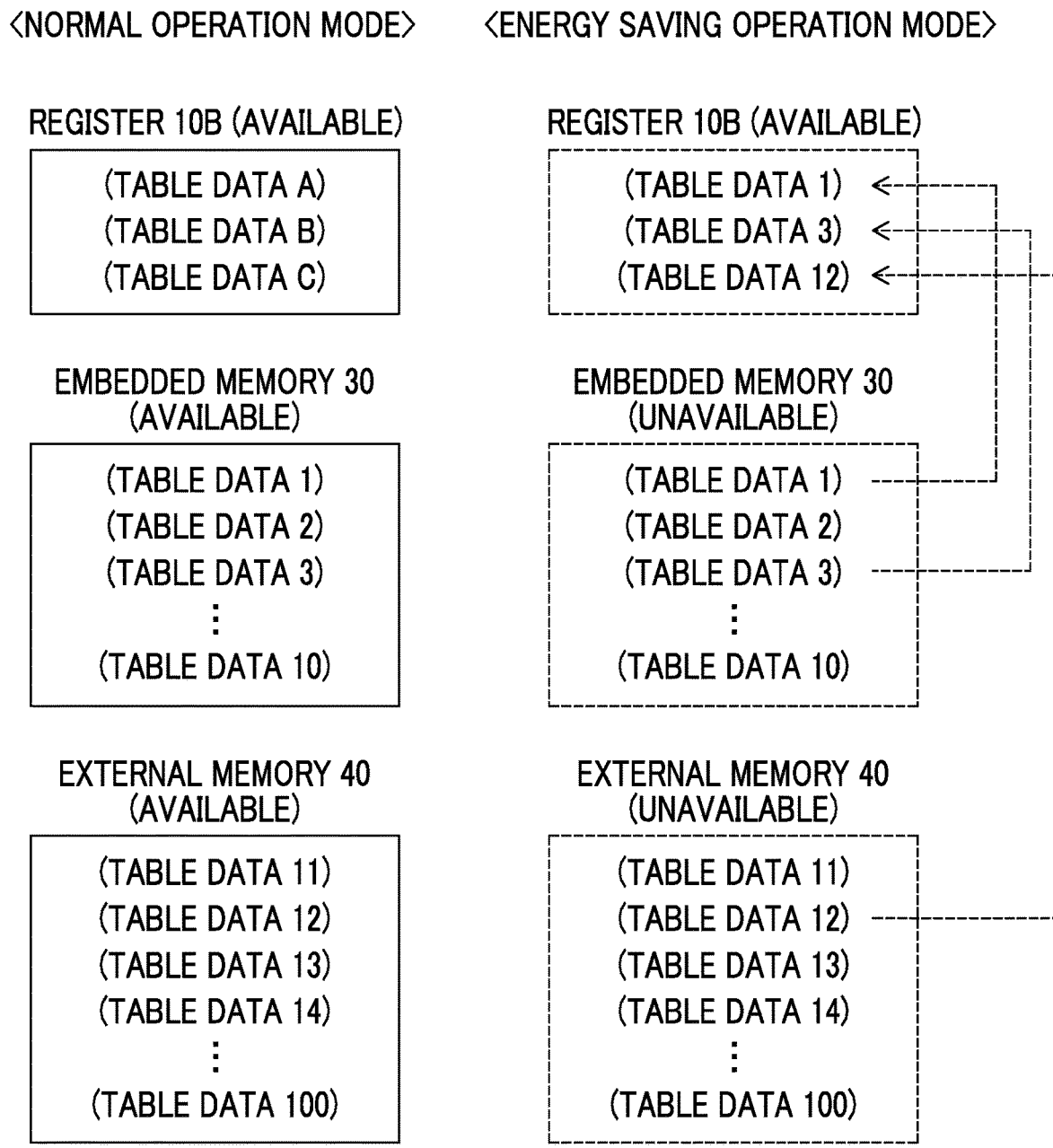
FIG. 9 is a diagram illustrating a modification example according to an operation mode of an available storage device.

FIG. 9 is a diagram illustrating a modification example according to an operation mode of an available storage device. FIG. 9 illustrates the three storage devices of the register 10B, the embedded memory 30, and the external memory 40 included in the LED control circuit 10 in FIG. 1.

Characteristics of each of the storage devices in a case where these three storage devices are compared with one another are as follows. The register 10B has a small storage capacity, low power consumption, and a high cost per unit capacity. The embedded memory 30 has a medium storage capacity, medium power consumption, and a medium cost per unit capacity. The external memory 40 has a large storage capacity, high power consumption, and a low cost per unit capacity. For example, by increasing the external memory 40 or using the external memory 40 having a larger storage capacity, the number of pieces of the table data may be increased.

FIG. 9 illustrates the storage device usable by the LED control circuit 10 in a normal operation mode and an energy saving operation mode.

The normal operation mode is a mode in which the control apparatus 100 (or device on which control apparatus 100 is mounted) may operate without the functions being limited, for example, by increasing the power consumption. In the normal operation mode, the LED control circuit 10 may use all of the three storage devices of the register 10B, the embedded memory 30, and the external memory 40.

For example, in the specific example illustrated in FIG. 9, the LED control circuit 10 may select the table data necessary to control the LED among table data A to C stored in the register 10B, table data 1 to 10 stored in the embedded memory 30, table data 11 to 100 stored in the external memory 40.

On the other hand, the energy saving operation mode is an operation mode in which the control apparatus 100 (or device on which control apparatus 100 is mounted) reduces the power consumption than the normal operation mode. A specific example of the energy saving operation mode includes, for example, a sleep mode.

In the energy saving operation mode, for example, a power to the embedded memory 30 and the external memory 40 is stopped (power off) and the LED control circuit 10 uses only the register 10B among the three storage devices.

Therefore, in the energy saving operation mode, the LED control circuit 10 may control the LED by using the table data stored in the register 10B, but may not use the table data not stored in the register 10B. Therefore, among the table data stored in the embedded memory 30 and the external memory 40, the table data used in the energy saving operation mode is stored in the register 10B.

For example, in the specific example illustrated in FIG. 9, in a case where the table data 1, 3, and 12 are used in the energy saving operation mode, before transition to the energy saving operation mode, the table data 1 and 3 stored in the embedded memory 30 and the table data 12 stored in the external memory 40 are copied to the register 10B. Therefore, in the energy saving mode, the LED control circuit 10 may control the LED by using the table data 1, 3, and 12 stored in the register 10B.

FIG. 10 is a diagram illustrating a specific example of LED control in the normal operation mode. FIG. 10 illustrates the specific example of a process executed by the CPU 20, the control pattern setting unit 10A, and the LED control unit 10C of the control apparatus 100 illustrated in FIG. 1.

In the specific example of the normal operation mode illustrated in FIG. 10, the CPU 20 performs an initial setting of a control pattern (S101). For example, a set value such as the PWM cycle and the luminance cycle (see FIG. 2) in the PWM control is initially set to the LED control unit 10C. Next, the CPU 20 sets an initial address to the control pattern setting unit 10A (S102) to activate the control pattern setting unit 10A (S103).

After the control pattern setting unit 10A is activated, the control pattern setting unit 10A first obtains the first parameter 1 (S201 in FIG. 10). For example, by a direct memory access (DMA) transfer, the control pattern setting unit 10A obtains the leading parameter 1 included in the first table data corresponding to the initial address in S102 among the table data stored in the register 10B, the embedded memory 30, and the external memory 40.

The control pattern setting unit 10A sets the obtained parameter 1 to the LED control unit 10C (S202 in FIG. 10) and instructs the LED control unit 10C to start the PWM control (S203 in FIG. 10). Accordingly, the luminance value, the luminance cycle, the number of times, and the like (see FIG. 3) included in the parameter 1 are set to the LED control unit 10C and the LED control unit 10C executes the PWM control corresponding to the parameter 1 (S301).

In addition, the control pattern setting unit 10A obtains the next parameter 2 corresponding to the next parameter address (see FIG. 3) included in the parameter 1 (S204 in FIG. 10). For example, by the DMA transfer, the control pattern setting unit 10A obtains the parameter 2 among the table data stored in the register 10B, the embedded memory 30, and the external memory 40.

Further, the control pattern setting unit 10A sets the obtained parameter 2 to the LED control unit 10C (S205 in FIG. 10). Accordingly, the luminance value, the luminance cycle, the number of times, and the like included in the parameter 2 are set to the LED control unit 10C. After the PWM control corresponding to the parameter 1 is completed, the parameter is changed (S302) and the LED control unit 10C executes the PWM control corresponding to the changed and new parameter 2 (S303).

Next, the control pattern setting unit 10A obtains the next parameter 3 corresponding to the next parameter address included in the parameter 2 (S206 in FIG. 10). For example, by the DMA transfer, the control pattern setting unit 10A obtains the parameter 3 among the table data stored in the register 10B, the embedded memory 30, and the external memory 40.

Further, the control pattern setting unit 10A sets the obtained parameter 3 to the LED control unit 10C (S207 in FIG. 10). Accordingly, the luminance value, the luminance cycle, the number of times, and the like included in the parameter 3 are set to the LED control unit 10C. After the PWM control corresponding to the parameter 2 is completed, the parameter is changed (S304) and the LED control unit 10C executes the PWM control corresponding to the changed and new parameter 3 (S305).

The control pattern setting unit 10A repeats obtaining the parameters until the next parameter does not exist (S208 in FIG. 10). That is, the control pattern setting unit 10A repeats obtaining the next parameter one after another up to the last parameter in which the presence or absence of the next parameter included in each of the parameters is set to absent.

In the specific example illustrated in FIG. 10, the parameter 3 is the last parameter. The LED control unit 10C terminates the PWM control after executing the PWM control corresponding to the parameter 3 which is the last parameter (S306). The control pattern setting unit 10A notifies the CPU 20 that the PWM control is completed (S209 in FIG. 10).

In addition, for example, while the control pattern setting unit 10A and the LED control unit 10C execute the LED control (PWM control) according to the parameter included in the table data, in a case of compulsory transition from the LED control to another LED control different from the LED control according to the table data, the CPU 20 sets an address of a transition destination to be compulsively shifted, to the control pattern setting unit 10A (S104).

In a case where the compulsory transition address (address of transition destination to be compulsively shifted) is set in S104 of the specific example illustrated in FIG. 10, the control pattern setting unit 10A obtains the compulsory transition parameter corresponding to the compulsory transition address as the next parameter (S206 in FIG. 10) and sets the compulsory transition parameter to the LED control unit 10C (S207 in FIG. 10). Accordingly, in S305, the LED control unit 10C executes the PWM control corresponding to the compulsory transition parameter.

FIG. 11 is a diagram illustrating a specific example of the LED control in the energy saving operation mode. FIG. 11 illustrates a specific example of another process executed by the CPU 20, the control pattern setting unit 10A, and the LED control unit 10C of the control apparatus 100 illustrated in FIG. 1.

In the specific example of the energy saving operation mode illustrated in FIG. 11, the CPU 20 performs the initial setting of the control pattern (S101). For example, a set value such as the PWM cycle and the luminance cycle (see FIG. 2) in the PWM control is initially set to the LED control unit 10C. Next, the CPU 20 sets an initial address for the energy saving operation mode to the control pattern setting unit 10A (S102) to activate the control pattern setting unit 10A (S103).

After the control pattern setting unit 10A is activated, the control pattern setting unit 10A first copies the table data for the energy saving operation mode to the register 10B (see S201 in FIG. 11). For example, after the process of S201 in FIG. 11 is completed, transition to the energy saving operation mode is performed.

Next, the control pattern setting unit 10A obtains the first parameter 1 (S202 in FIG. 11). For example, by the DMA transfer, the control pattern setting unit 10A obtains the leading parameter 1 included in the first table data corresponding to the initial address in S102 among the table data copied to the register 10B.

The control pattern setting unit 10A sets the obtained parameter 1 to the LED control unit 10C (S203 in FIG. 11) and instructs the LED control unit 10C to start the PWM control (S204 in FIG. 11). Accordingly, the luminance value, the luminance cycle, the number of times, and the like (see FIG. 3) included in the parameter 1 are set to the LED control unit 10C and the LED control unit 10C executes the PWM control corresponding to the parameter 1 (S301).

In addition, the control pattern setting unit 10A obtains the next parameter 2 corresponding to the next parameter address (see FIG. 3) included in the parameter 1 (S205 in FIG. 11). For example, by the DMA transfer, the control pattern setting unit 10A obtains the parameter 2 among the table data copied to the register 10B.

Further, the control pattern setting unit 10A sets the obtained parameter 2 to the LED control unit 10C (S206 in FIG. 11). Accordingly, the luminance value, the luminance cycle, the number of times, and the like included in the parameter 2 are set to the LED control unit 10C. After the PWM control corresponding to the parameter 1 is completed, the parameter is changed (S302) and the LED control unit 10C executes the PWM control corresponding to the changed and new parameter 2 (S303).

Next, the control pattern setting unit 10A obtains the next parameter 3 corresponding to the next parameter address included in the parameter 2 (S207 in FIG. 11). For example, by the DMA transfer, the control pattern setting unit 10A obtains the parameter 3 among the table data copied to the register 10B.

Further, the control pattern setting unit 10A sets the obtained parameter 3 to the LED control unit 10C (S208 in FIG. 11). Accordingly, the luminance value, the luminance cycle, the number of times, and the like included in the parameter 3 are set to the LED control unit 10C. After the PWM control corresponding to the parameter 2 is completed, the parameter is changed (S304) and the LED control unit 10C executes the PWM control corresponding to the changed and new parameter 3 (S305).

The control pattern setting unit 10A repeats obtaining the parameters until the next parameter does not exist (S209 in FIG. 11). That is, the control pattern setting unit 10A repeats obtaining the next parameter one after another up to the last parameter in which the presence or absence of the next parameter included in each of the parameters is set to absent.

In the specific example illustrated in FIG. 11, the parameter 3 is the last parameter. The LED control unit 10C terminates the PWM control after executing the PWM control corresponding to the parameter 3 which is the last parameter (S306). The control pattern setting unit 10A notifies the CPU 20 that the PWM control is completed (S210).

In addition, for example, while the control pattern setting unit 10A and the LED control unit 10C execute the LED control (PWM control) according to the parameter included in the table data, in a case of compulsory transition from the LED control to another LED control different from the LED control according to the table data, the CPU 20 sets an address of a transition destination to be compulsively shifted, to the control pattern setting unit 10A (S104).

In a case where the compulsory transition address (address of transition destination to be compulsively shifted) is set in S104 of the specific example illustrated in FIG. 11, the control pattern setting unit 10A obtains the compulsory transition parameter corresponding to the compulsory transition address as the next parameter (S207 in FIG. 11). In a case where the table data including the compulsory transition parameter does not exist in the register 10B, for example, powers of the embedded memory 30 and the external memory 40 are temporarily supplied (power on) and the table data including the compulsory transition parameter among the table data stored in the embedded memory 30 and the external memory 40 is copied to the register 10B. Then, the control pattern setting unit 10A sets the compulsory transition parameter to the LED control unit 10C (S208 in FIG. 11). Accordingly, in S305, the LED control unit 10C executes the PWM control corresponding to the compulsory transition parameter.

As described above, the embodiment of the exemplary embodiment of the invention is described, but the described embodiment is merely an example in all respects and is not intended to limit the scope of the invention. The exemplary embodiment of the invention includes various modifications without departing from the scope of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control apparatus of a light emitting diode, comprising:
    a storage unit that stores table information indicating a combination of a magnitude and a cycle of luminance and the number of times of the combination, wherein the table information is configured to include a plurality of parameters and each of the parameters includes the combination of the magnitude and the cycle of the luminance, the number of times of the combinations, and next parameter information, s; and
    a control section that controls the light emitting diode in accordance with a control pattern in which the combination of the magnitude and the cycle of the luminance indicated in the table information is repeated up to the number of times of the combinations, and the control section further executes control corresponding to each of the parameters and executes control corresponding to the next parameter designated by the next parameter information to execute control corresponding to the plurality of parameters included in the table information one after another.

2. The control apparatus of the light emitting diode according to claim 1, wherein
    the storage unit comprising a plurality of storage devices, and
    the control section comprising a control circuit,
    wherein the storage device usable by the control circuit is changed according to an operation mode in a plurality of operation modes having different power consumption from one another.

3. The control apparatus of the light emitting diode according to claim 2,
    wherein the plurality of storage devices include a register included in the control circuit and a memory connected to the control circuit.

4. The control apparatus of the light emitting diode according to claim 3,
    wherein the control circuit is capable of using the register and the memory in a normal operation mode, and
    the control circuit is capable of using only the register in an energy saving operation mode in which power consumption is more reduced than the normal operation mode.

5. The control apparatus of the light emitting diode according to claim 4,
    wherein at least some pieces of information among the table information stored in the memory are stored in the register, and
    the control circuit controls the light emitting diode in accordance with the at least some pieces of information stored in the register in the energy saving operation mode.

6. The control apparatus of the light emitting diode according to claim 5,
    wherein in a case where compulsory transition is set, the control section shifts from the control corresponding to the plurality of parameters included in the table information to control corresponding to a parameter designated as a transition destination of the compulsory transition.

7. The control apparatus of the light emitting diode according to claim 4,
    wherein in a case where compulsory transition is set, the control section shifts from the control corresponding to the plurality of parameters included in the table information to control corresponding to a parameter designated as a transition destination of the compulsory transition.

8. The control apparatus of the light emitting diode according to claim 2,
    wherein in a case where compulsory transition is set, the control section shifts from the control corresponding to the plurality of parameters included in the table information to control corresponding to a parameter designated as a transition destination of the compulsory transition.

9. The control apparatus of the light emitting diode according to claim 3,
wherein in a case where compulsory transition is set, the control section shifts from the control corresponding to the plurality of parameters included in the table information to control corresponding to a parameter designated as a transition destination of the compulsory transition.

10. The control apparatus of the light emitting diode according to claim 1, wherein the table information further indicates the magnitude of the luminance according to a difference between a function value corresponding to a luminance change and a luminance value of the control pattern, wherein the function value refers to a change in luminance values during a time period of a predetermined pattern.

11. A non-transitory computer readable medium storing a program causing a computer to realize a function, the function comprising:
storing table information indicating a combination of a magnitude and a cycle of luminance and the number of times of the combinations, wherein the table information is configured to include a plurality of parameters and each of the parameters includes the combination of the magnitude and the cycle of the luminance, the number of times of the combinations, and next parameter information;
controlling a light emitting diode in accordance with a control pattern in which the combination of the magnitude and the cycle of the luminance indicated in the table information is repeated up to the number of times of the combinations; and
executing control corresponding to each of the parameters and executes control corresponding to the next parameter designated by the next parameter information to execute control corresponding to the plurality of parameters included in the table information one after another.

12. A control apparatus of a light emitting diode, comprising:
a storage unit that stores table information indicating a combination of a magnitude and a cycle of luminance and the number of times of the combinations; and
a control section that controls the light emitting diode in accordance with a control pattern in which the combination of the magnitude and the cycle of the luminance indicated in the table information is repeated up to the number of times of the combinations,
wherein the table information is configured to include a plurality of parameters and each of the parameters includes the combination of the magnitude and the cycle of the luminance, the number of times of the combinations, and next parameter information, and
the control section executes control corresponding to each of the parameters and executes control corresponding to the next parameter designated by the next parameter information to execute control corresponding to the plurality of parameters included in the table information one after another.

13. A control apparatus of a light emitting diode according to claim 12,
wherein in a case where compulsory transition is set, the control section shifts from the control corresponding to the plurality of parameters included in the table information to control corresponding to a parameter designated as a transition destination of the compulsory transition.

* * * * *